US009491422B2

United States Patent
Perkins et al.

(10) Patent No.: US 9,491,422 B2
(45) Date of Patent: *Nov. 8, 2016

(54) TWO-STAGE LIGHT MODULATION FOR HIGH DYNAMIC RANGE

(71) Applicant: Christie Digital Systems USA, Inc., Cypress, CA (US)

(72) Inventors: Michael Perkins, Kitchener (CA); Duane Scott Dewald, Dallas, TX (US); Nathan Wainwright, Plano, TX (US)

(73) Assignee: Christie Digital Systems USA, Inc., Cypress ( * ) Notice: Subject to any disclaimer, the term of this patent is extended or adjusted under 35 U.S.C. 154(b) by 0 days.

This patent is subject to a terminal disclaimer.

(21) Appl. No.: 14/949,083

(22) Filed: Nov. 23, 2015

(65) Prior Publication Data

US 2016/0142686 A1  May 19, 2016

Related U.S. Application Data

(63) Continuation of application No. 14/070,627, filed on Nov. 4, 2013, now Pat. No. 9,232,172.

(51) Int. Cl.
*H04N 5/74* (2006.01)
*H04N 9/31* (2006.01)
(Continued)

(52) U.S. Cl.
CPC ........ *H04N 9/3105* (2013.01); *G02B 13/0095* (2013.01); *G02B 17/006* (2013.01);
(Continued)

(58) Field of Classification Search
CPC .. H04N 5/7416; H04N 9/3216; H04N 9/315; G02B 13/0095; G02B 27/0927
USPC ......... 348/759, 744, 752, 755–758; 359/237, 359/434
IPC ....................................................... H04N 5/74
See application file for complete search history.

(56) References Cited

U.S. PATENT DOCUMENTS

2003/0063226 A1* 4/2003 Gibbon .............. G02B 27/1066
  348/771
2004/0263989 A1* 12/2004 Cobb .................. G02B 5/3058
  359/634
2011/0261174 A1* 10/2011 Silverstein ............ G03B 35/26
  348/58

FOREIGN PATENT DOCUMENTS

WO    WO2015023762 A2 *  2/2015

OTHER PUBLICATIONS

Perkins, Michael et al., "Two-Stage Light Modulation for High Dynamic Range", U.S. Appl. No. 14/070,627, filed Nov. 4, 2013.

*Primary Examiner* — Sherrie Hsia
(74) *Attorney, Agent, or Firm* — Perry+ Currier Inc.

(57) ABSTRACT

An imaging apparatus for two-stage light modulation in high-definition digital projection or cinema can include two light modulators. Each light modulator can include a multi-chip imaging system coupled to a total internal reflection prism (TIR) system, which has a light input face and an on-state face. Relay optics can be positioned between the two light modulators. The relay optics can be configured to defocus light received from the pre-modulator and to provide defocused light to the prime modulator using a substantially Gaussian pixel shaping function. The prime modulator can be oriented to receive defocused light from the relay optics at the light input face of its TIR prism system. The pre-modulator can be oriented backwards, so as to receive source light at the on-state face of its TIR prism system and to output pre-modulated light to the relay optics via the light input face of the TIR prism system.

24 Claims, 10 Drawing Sheets

(51) Int. Cl.
  *G02B 13/00* (2006.01)
  *G02B 27/09* (2006.01)
  *G02B 17/00* (2006.01)
  *G03B 21/20* (2006.01)

(52) U.S. Cl.
  CPC .......... *G02B17/008* (2013.01); *G02B 27/0927* (2013.01); *G03B 21/208* (2013.01); *G03B 21/2033* (2013.01); *H04N 5/7416* (2013.01); *H04N 9/315* (2013.01); *H04N 9/3126* (2013.01); *H04N 9/3155* (2013.01)

TWO-STAGE LIGHT MODULATION FOR HIGH DYNAMIC RANGE

CROSS-REFERENCE TO RELATED APPLICATIONS

This application is a continuation of U.S. patent application Ser. No. 14/070,627, filed Nov. 4, 2013, the entire contents of which are incorporated herein by reference.

FIELD

This disclosure relates to digital imaging, more specifically, to two-stage light modulation.

BACKGROUND

In imaging apparatuses, such as digital projection systems, dynamic range of an image is limited by the capabilities of the chosen imager. This applies to digital light processing (DLP) imagers (e.g., digital micromirror displays), liquid crystal on silicon (LCOS) imagers, liquid-crystal display (LCD) imagers, as well as imagers using other technologies. Two-stage modulation can be used to increase dynamic range as well as improve contrast ratio. However, many known two-stage modulation systems are inefficient and do not provide dynamic range that is suitably high or do not provide adequate contrast ratio.

SUMMARY

According to one aspect of the present disclosure, an imaging apparatus includes a light source configured to emit source light and a pre-modulator positioned in a path of the source light. The pre-modulator includes a pre-modulating imaging system configured to perform coarse modulation on the source light according to image data and to emit pre-modulated light at a pre-modulator output. The pre-modulator further includes a first total internal reflection prism system oriented to refract the source light into the pre-modulating imaging system and to reflect the pre-modulated light received from the pre-modulated imaging system to the pre-modulator output. The apparatus further includes relay optics positioned in a path of the pre-modulated light and configured to defocus the pre-modulated light to output defocused light, and a prime modulator positioned in a path of the defocused light. The prime modulator includes a prime modulating imaging system configured to generate an image using the defocused light according to the image data. The prime modulator further includes a second total internal reflection prism system oriented to reflect the defocused light to the prime modulating imaging system and to refract the image received from the prime imaging system to a prime modulator output.

According to another aspect of the present disclosure, an imaging apparatus includes a light source configured to emit source light and two light modulators. Each light modulator includes a multi-chip imaging system coupled to a total internal reflection prism system. The total internal reflection prism system has a light input face and an on-state face. The apparatus further includes relay optics positioned between a pre-modulator of the two light modulators and a prime modulator of the two light modulators. The relay optics are configured to defocus light received from the pre-modulator and to provide defocused light to the prime modulator. The prime modulator is oriented to receive defocused light from the relay optics at the light input face of the total internal reflection prism system. The pre-modulator is oriented to receive source light at the on-state face of the total internal reflection prism system and to output pre-modulated light to the relay optics via the light input face of the total internal reflection prism system.

According to another aspect of the present disclosure, an imaging apparatus includes a light source configured to emit source light and a pre-modulator positioned in a path of the source light. The pre-modulator includes three digital micromirror devices coupled to color-component splitters and combiners and a total internal reflection prism system. The pre-modulator is configured to perform coarse modulation on the source light according to image data and to emit pre-modulated light. The apparatus further includes relay optics positioned in a path of the pre-modulated light and configured to defocus the pre-modulated light to output defocused light, and a prime modulator positioned in a path of the defocused light. The prime modulator includes three digital micromirror devices coupled to color-component splitters and combiners and a total internal reflection prism system. The prime modulator is configured to generate an image using the defocused light according to the image data.

BRIEF DESCRIPTION OF THE DRAWINGS

The drawings illustrate, by way of example only, embodiments of the present disclosure.

The patent or application file contains at least one drawing executed in color. Copies of this patent or patent application publication with color drawing(s) will be provided by the Office upon request and payment of the necessary fee.

DETAILED DESCRIPTION

The techniques for two-stage modulation described herein can increase the dynamic range and contrast of an imaging apparatus, such as an image projector used in digital video/cinema. The modulators described herein are subtractive, in that they operate on a full field of light and discard portions of light not needed to form the image to be displayed or projected. A first stage, or pre-modulator, performs a coarse modulation on the light and a second stage, or prime modulator, performs a fine modulation. The pre-modulator operates so that local regions of the prime modulator receive only as much light as is required to support the image at that locality. Dark portions of the image receive a small amount of light and bright areas receive a large amount. Hence, in an image that has dark and bright regions, the prime modulator will be unevenly lit. Further, because the prime modulator retains its own dynamic range independent of that of the pre-modulator, the prime modulator operates to apply very fine detail to both light and dark regions.

Figure 1:
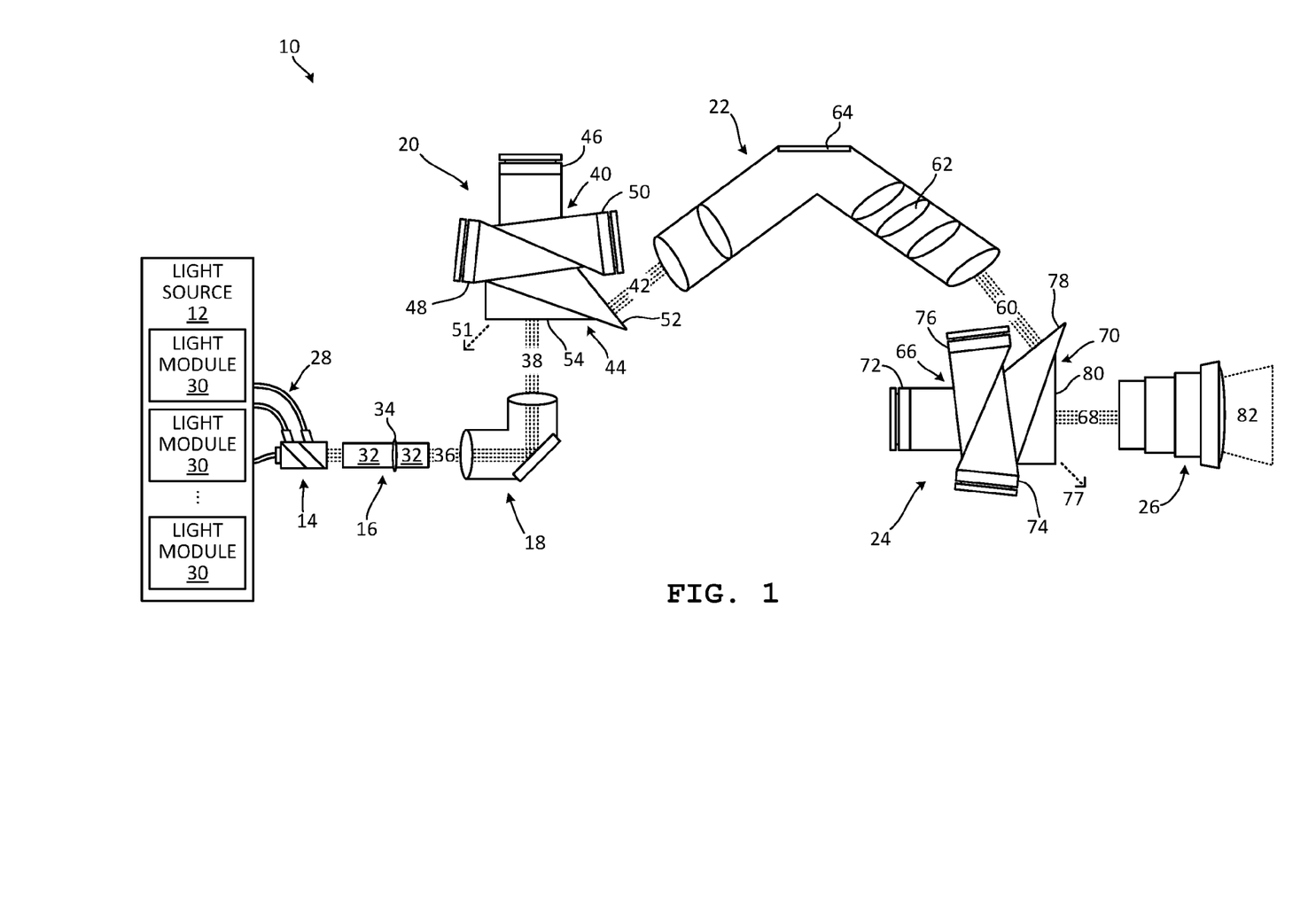
FIG. 1 is a block diagram of an imaging apparatus.

FIG. 1 shows an imaging apparatus 10 according to an embodiment of the present disclosure. The imaging apparatus 10 includes a light source 12, a dichroic combiner 14, an integrator 16, overfill optics 18, a pre-modulator 20, relay optics 22, a prime modulator 24, and projection optics 26. Light emitted by the light source 12 is coarsely modulated by the pre-modulator 20 to provide a suitable amount of light for the prime modulator 24, which generates images. Relay optics 22 relay the light from the pre-modulator 20 to the prime modulator 24 while applying a controlled defocus to the light, so as to disperse the coarsely modulated light on the prime modulator 24. Accordingly, higher dynamic range and better contrast than found with current two-stage modulation techniques may be achieved.

The light source 12 is configured to emit source light and may include a plurality of laser light sources of different color components (e.g., red, green, and blue). Light of different color components may be generated independently and then coupled through fiber optics 28 to the dichroic combiner 14. The light source 12 may include a plurality of light modules 30 to provide brightness scalability for each color component. That is, each module 30 supplies a certain amount of red, green, or blue light, and modules 30 can be provided, omitted, or turned on/off based on brightness requirements. Adding or turning on modules 30 allows brightness to be increased in discrete increments. Conversely, removing or turning off modules 30 allows brightness to be decreased in discrete increments. The number of modules 30 used in a given implementation can be varied with the size of screen to be projected. Larger screens are contemplated to require more modules 30. Further, the wavelengths and relative power of each color component can be chosen to increase efficiency while achieving a large color gamut and a suitable white point.

The dichroic combiner 14 optically combines component source light (e.g., red, green, and blue) into a single white beam of light. The dichroic combiner 14 can be a separate component, as shown, or can be included in the light source 12.

In other embodiments, the light source 12 includes lasers and free space optics, one or more lamps (e.g., a xenon lamp or mercury arc lamp), light-emitting diodes (LEDs), phosphor-converted lasers, or similar.

The integrator 16 includes a combination of one or more integrating rods 32 and one or more diffusers 34 configured to homogenize the source light, spatially and angularly, and to shape the source light into a rectangle or a near rectangle. In this embodiment, integrator 16 includes the two integrating rods 32 and a diffuser 34 disposed between the two integrating rods.

The integrator 16 may be configured so that the aspect ratio of the outputted rectangle of source light 36 is sized to match, as closely as practical, the aspect ratio of a imaging device of the pre-modulator 20. For example, if the pre-modulator 20 is provided with a digital micromirror device (DMD) having a resolution of 2048×1080 pixels, the integrator 16 is configured to have an aspect ratio of 1.89:1 (i.e., 2048/1080) at its output. The integrator 16 can be provided with integrating rods that are as long as space permits to allow more reflection therein, so as to improve uniformity of the outputted rectangle of source light 36. This is particularly useful when highly collimated sources, such as lasers, are used at the light source 12.

Providing the integrator 16 with the diffuser 34 may have several benefits. First, the diffuser 34 can randomize angles at which light is travelling to increase the effectiveness of the second integrating rod 32 in homogenizing and providing uniformity to the light. Second, the increase in angular disparity of the light beam caused by the diffuser can help reduce speckle, which is a known problem with laser illumination. Third, the diffuser 34 can help to even out the angular distribution of the light beam.

The rectangle of source light 36 output from the last integrating rod 32 is ultimately imaged onto the pre-modulator 20. By placing this integrating rod 32 after the diffuser 34 as opposed placing the diffuser 34 at the end of the integrator 16, diffuser 34 itself will not be imaged on the pre-modulator 20, while still providing the benefit of good uniformity and good angular distribution.

Overfill optics 18 may include elements such as one or more lenses and one or more mirrors positioned to relay the rectangle of source light 36 output by the integrator 16 onto the pre-modulator 20 with a small amount of overfill. In this embodiment, an output face of the last integrating rod 32 may be smaller than the imaging device of the pre-modulator 20. Overfill optics 18 may be configured to provide magnification to achieve suitable overfill. A fold mirror may be included with the overfill optics to reduce the overall size of the imaging apparatus 10. The overfill optics may have adjustable zoom and alignment configured to allow precise definition of the shape and amount of overfill. Overfill optics 18 may be referred to as an imaging optical system (IOS).

The pre-modulator 20 is positioned in the path 38 of the source light, as outputted by the overfill optics 18. The pre-modulator 20 includes a pre-modulating imaging system 40 configured to perform coarse modulation on the source light according to image data. At its output the pre-modulator 20 emits pre-modulated light 42 to the relay optics 22. The pre-modulator 20 further includes a first total internal reflection prism (TIR) system 44 coupled to the pre-modulating imaging system 40 for conveying source light 38 to the pre-modulating imaging system 40 and conveying pre-modulated light 42 to the relay optics 22. The pre-modulator 20 may be referred to as a light engine.

The pre-modulating imaging system 40 can include one or more imaging devices (or imagers). The pre-modulating imaging system 40 may be a multi-chip imaging system that may include one or more DMDs coupled to color-component splitters and combiners. Suitable DMDs are available from Texas Instruments Inc. of Dallas, Tex. In this embodiment, the pre-modulator 20 includes three DMDs 46, 48, 50 coupled to color-component splitters and combiners, such as one or more dichroic prisms, for three color components such as red, green, and blue. Light entering the pre-modulating imaging system 40 is split into red, green, and blue components, and each color of light is directed onto an independently controllable DMD 46, 48, 50. Off-state light 51 of each DMD 46, 48, 50 is directed to a light dump that absorbs as much off-state light as practical, which may help increase contrast ratio. The pre-modulating imaging system 40 may be known as a DLP system.

Figure 10:
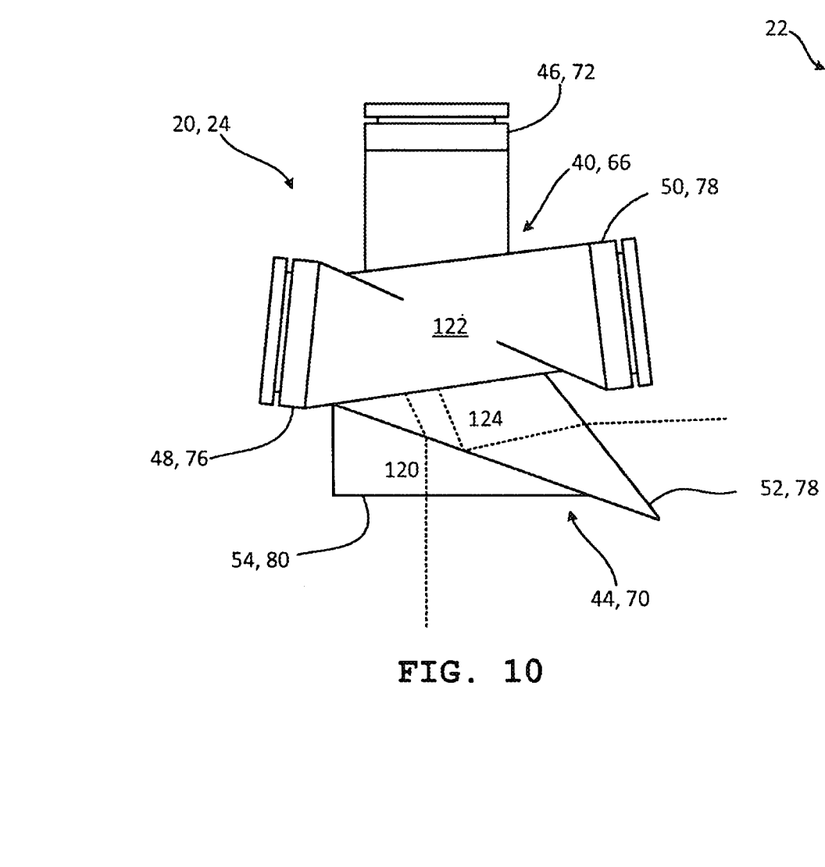
FIG. 10 is a diagram of a modulator showing light paths.

The first total internal reflection prism system 44 is oriented to refract source light 38 into the pre-modulating imaging system 40 and to reflect the pre-modulated light 42 received from the pre-modulated imaging system 40 towards the relay optics 22. This is shown in FIG. 10, where light at 120 enters the total reflection prism system 44 and refracts into the color-component splitters and combiners 122, is processed by the DMDs 46, 48, 50, before exiting the total reflection prism system 44 via reflection at 124.

The pre-modulator 20 may use a known design or may be an off-the-shelf unit. As such, the total internal reflection prism system 44 may have a light input face 52 and an on-state (or output) face 54. However, in this embodiment, the pre-modulator 20 is oriented such that output of the pre-modulator 20 is taken from the light input face 52. Light enters the pre-modulator 20 through what, in known applications, is the on-state face 54. That is to say, the pre-modulator 20 is operated backwards. When used in this orientation the off-state light 51 is directed in the same general direction it would go in a known application, but at half the angle. The on-state light is directed out of what is nominally the light input face 52.

Figure 2A:
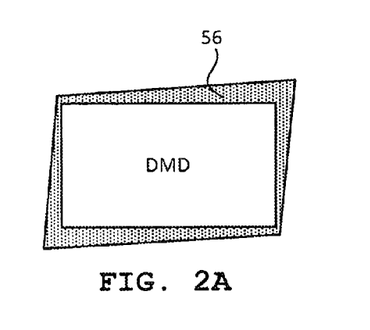
FIG. 2A is a diagram showing a conventional overfill region.
Figure 2B:
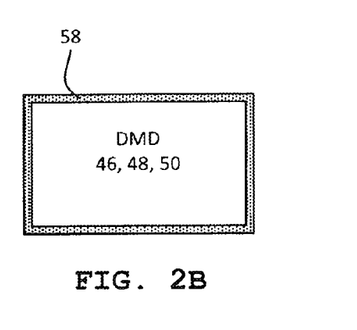
FIG. 2B is a diagram showing an overfill region according to an embodiment.

Orientating the pre-modulator 20 opposite to how it would be used in a conventional application offers at least one advantage. With reference to FIG. 2A, in a conventional application, light may approach a DMD at an angle of approximately 24 degrees, and thus light tends to form a trapezoidal patch on the DMD with a relatively large region 56 of overfill loss. In the apparatus 10, light strikes the DMDs 46, 48, 50 closer to perpendicularly, as shown in FIG. 2B, which results in more efficient overfill with less wasted light due to rectangular or near rectangular regions 58 of overfill.

The relay optics 22 are positioned between the pre-modulator 20 and the prime modulator 24 in the path of the pre-modulated light 42. The relay optics 22 are configured to defocus the pre-modulated light 42, so as to output defocused light 60. The relay optics 22 may be configured to apply a pixel shaping function to the pre-modulated light 42, and may be referred to as pixel shaping function optics.

The relay optics 22 are configured to provide controlled defocus. In this embodiment, the relay optics 22 are configured to transform each pixel of pre-modulated light 42 received from the pre-modulator 20 into a Gaussian or pseudo-Gaussian shaped spot at the prime modulator 24. In addition, if the imaging devices (e.g., DMDs 46, 48, 50) of the pre-modulator 20 differ in size from those of the prime modulator 24, then the relay optics 22 may be configured to provide a suitable amount of magnification. As such, the relay optics 22 may include a suitable arrangement of lenses 62. Even when the imaging devices of the pre-modulator 20 are the same size as those of the prime modulator 24, the relay optics 22 may be configured to provide a small amount of magnification in order to slightly over fill the prime modulator 24. Image alignment between the two modulators 20, 24 can then be performed electronically by a processor, which may relax manufacturing tolerances on the relay optics 22. It may be beneficial to keep any overfill on the prime modulator 22 as small as practical to reduce light waste.

Pseudo-Gaussian does not strictly conform to a Gaussian function, but does result in light being distributed in a similar manner. A closer approximation of a true Gaussian function may result in better light distribution. However, any increase in processing or optical complexity should be taken into account. Trade-offs in image quality and apparatus complexity are contemplated and the term "substantially Gaussian" is used to indicate that some flexibility is contemplated for the shape of the spot and that a true Gaussian function makes for one example of suitable ideal that can be referenced when evaluating candidate spot shapes during implementation.

The relay optics 22 may further include a fold mirror 64 to align the relayed image represented by the defocused light 60 with the prime modulator 24. The fold mirror 64 reduces a rotational difference between the image represented by the defocused light 60 and the prime modulator 24. The fold mirror 64 may be omitted provided that any resulting inefficient use of light and resolution can be tolerated.

The relay optics 22 may be configured to provide little or no chromatic aberration to the defocused light 60. However, since red, green, and blue are processed independently, the size and shape of the pixel shaping function provided by the relay optics 22 can be allowed to vary between colors. Geometric distortion (i.e., pin cushion or barrel distortion), if present, can be compensated for by image processing.

The prime modulator 24 is positioned in the path of the defocused light 60. The prime modulator 24 includes a prime modulating imaging system 66 configured to generate an image 68 using the defocused light 60 and the image data. The prime modulator 24 may be referred to as a light engine.

At its output the prime modulator 24 emits the image 68 to the projection optics 26. The prime modulator 24 further includes a second total internal reflection prism system 70 coupled to the prime modulating imaging system 66 for conveying the defocused light to the prime modulating imaging system 66 and conveying the image 68 to the projection optics 26.

The prime modulating imaging system 66 can include one or more imaging devices. The prime modulating imaging system 66 may be a multi-chip imaging system that may include one or more DMDs coupled to color-component splitters and combiners. In this embodiment, the prime modulator 24 includes three DMDs 72, 74, 76 coupled to color-component splitters and combiners, such as one or more dichroic prisms, for three color components such as red, green, and blue. Light entering the prime modulating imaging system 66 is split into red, green, and blue components, and each color of light is directed onto an independently controllable DMD 72, 74, 76. Off-state light 77 of each DMD 72, 74, 76 is directed to a light dump that absorbs as much off-state light as practical, which may help increase contrast ratio. As with the pre-modulating imaging system 40, the prime modulating imaging system 66 may be referred to as a DLP system.

The second total internal reflection prism system 70 is oriented to reflect defocused light 60 to the prime modulating imaging system 66 and to refract and combine images received from the prime imaging system 66 to the output of the prime modulator 24 as the image 68. The second total internal reflection prism system 70 includes a light input face 78 and an on-state (or output) face 80. As with the pre-modulator 20, the prime modulator 24 may use a known design or may be an off-the-shelf unit. However, in this embodiment, the prime modulator 24 is oriented such that defocused light 60 enters at the light input face 78 and output of the prime modulator 24 is taken from the on-state face 80. Thus, the prime modulator 24 is oriented conventionally and in an orientation opposite that of the pre-modulator 20. This is shown in FIG. 10, where light at 124 enters the total reflection prism system 70 and reflects into the color-component splitters and combiners 122, is processed by the DMDs 72, 74, 76, before exiting the total reflection prism system 70 via refraction at 120. Off-state light is handled in a known manner.

It is advantageous that the prime modulator 24 and pre-modulator 20 are oriented oppositely. The modulators 20, 24 may be of optically similar designs, the same design at different resolutions, or identical designs with the same resolution, and their back-to-back arrangement can results in the light paths between DMDs being approximately balanced in terms of the amount of time spent in the respective mediums (e.g., air and prism material, such as glass, acrylic, or other material).

The DMDs 46, 48, 50 of the pre-modulator 20 and the DMDs 72, 74, 76 of the prime modulator 24 may have any suitable resolution. The pre-modulator DMDs 46, 48, 50 may have a resolution that is the same as, greater than, or less than that of the prime modulator DMDs 72, 74, 76. In one example, as mentioned above, the pre-modulator DMDs 46, 48, 50 each have a resolution of 2048×1080 pixels and the prime modulator DMDs 72, 74, 76 each have twice the resolution, that is, 4096×2160 pixels. Hence, a 2×2 set of pixels of each prime modulator DMD 72, 74, 76 corresponds to a single pixel of each pre-modulator DMD 46, 48, 50.

The aspect ratio of the pre-modulator 20 can be selected to match that of the prime modulator 24. Larger pixels at the pre-modulator 20 may result in lower diffraction losses. Hence, the modulators 20, 24 can be selected to have the same aspect ratio, but the pre-modulator 20 can be selected to have a lower resolution than the prime modulator 24 without sacrificing much or any dynamic range. In addition, for high-brightness applications, a physically large device may increase available etendue and help with thermal management. While a higher resolution may result in fewer artifacts (e.g., halos around bright objects), the resolution of many commercially available DMDs exceeds what is contemplated to be required for suitable high dynamic range and is therefore not a major consideration in selecting a specific DMD for the pre-modulator 20. Almost any commercially available DMD may be suitable for use in the pre-modulator 20.

The projection optics 26 are positioned to receive the image 68 from the output of the prime modulator 24 and to cast a projected image 82 onto a screen or similar surface. Projection optics 26 may be of known design or may be an off-the-shelf unit, which is a benefit of using the back-to-back arrangement of modulators 20, 24. That is, because the prime modulator 24 is arranged in the known manner, little or no special consideration need be given for the projection optics 26.

Figure 3:
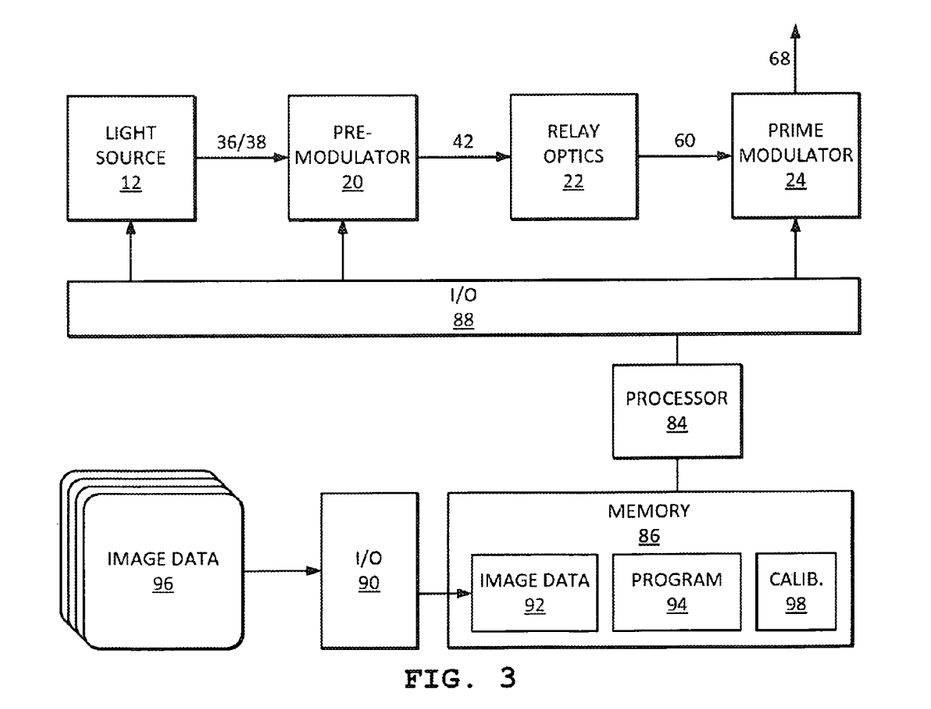
FIG. 3 is a block diagram of image processing components of the imaging apparatus.

FIG. 3 shows image processing components of the imaging apparatus 10. The imaging apparatus 10 may further include a processor 84, memory 86, and input/output interfaces 88, 90.

The processor 84 is connected to the I/O interface 88 and the memory 86. The processor 84 is configured to receive instructions, logic signals, programmatic code, or similar from the memory 86 and execute such to output commands to the I/O interface 88. Such commands are destined for any of controllable optical elements of the imaging apparatus 10, such as the light source 12, pre-modulator 20, and prime modulator 24. The processor 84 may include a single processor, multiple processors, a microprocessor, a central processing unit (CPU), a field-programmable gate array (FPGA), an application-specific integrated circuit (ASIC), or similar device. Although the processor 84 and memory 86 are illustrated and discussed separately for sake of explanation, this is not intended to be limiting and some implementations (e.g., FPGA or ASIC) may have processing and storage capabilities within the same device.

The memory 86 includes non-transitory computer-readable medium, such as random access memory (RAM), read-only memory (ROM), FPGA memory elements, flash memory, magnetic or optical storage, or similar. The memory 86 stores image data 92 as well as one or more programs 94 to operate on the image data 92 and provide the processor 84 with instructions to control the controllable optical elements. The memory 86 may store some or all data for one or more images or videos to be output at 68.

The I/O interface 88 may be an internal or external interface suitable for receiving image data 96, which may be internally or externally stored on non-transitory computer-readable medium, such as the kinds described above, or may be provided as a stream of video data (e.g., live video, computer renderings, etc). For example, the image data 92 stored in high-speed working memory 86 may be several frames of a video that is stored as image data 96 in external long-term storage, such as at a removable optical or magnetic disc or a removable memory card.

The program 94 is configured to control one or more of the light source 12, pre-modulator 20, and prime modulator 24 with reference to the image data 92 as discussed elsewhere herein. The program 94 may be configured to control the pre-modulator 20 and prime modulator 24 based on color intensities of the image data 92. The program 94 may further be configured to turn modules 30 of the light source 12 off and on based on color intensities of the image data 92. The program 94 may also be configured to perform image alignment to correct for any misalignment among the modulators 20, 24 and relay optics 22, and further to compensate for any geometric distortion of the image at the prime modulator 24.

In order for the processor 84 to generate an image for each DMD 72, 74, 76 of the prime modulator 24, the processor 84 may reference results of a light field simulation, which can be generated from calibration data 98 accessible to the program 94 or as part of the program 94 itself. Such a light field simulation can be configured to use a calibration image that is displayed on the pre-modulator 20 and to determine the effect of the relay optics 22 on the calibration image. The program 94 can be configured to compare the actual generated light field to the estimated light field resulting from the simulation and to use the differences to refine the calibration data 98 until suitable calibration data 98 is obtained.

Figure 12:
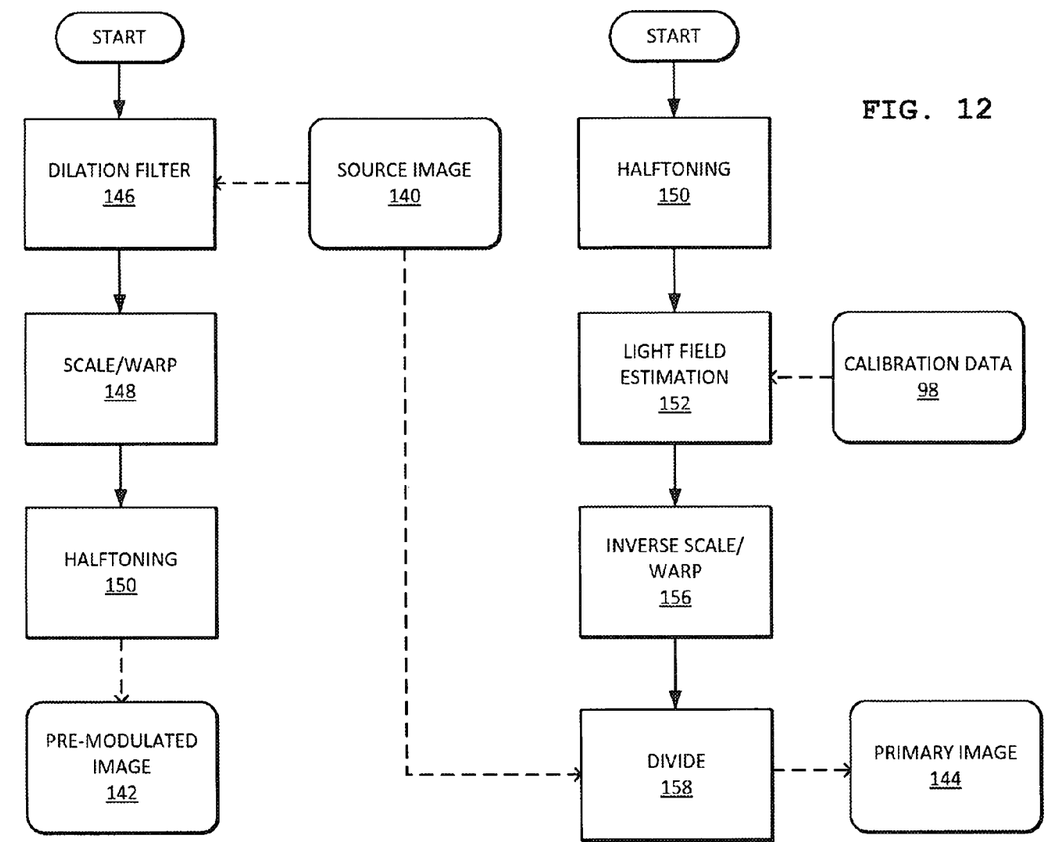
FIG. 12 is a flowchart of a method of operation for the imaging apparatus.

In operation, as shown in FIG. 12, a single source image 140 is used to generate two correlated display images 142, 144, one image 142 for the pre-modulator 20 and one image 144 for the prime modulator 24. A dilation filter 146 can be applied to a single pixel for the pre-modulator image 142 to spread out the pixel to cover a larger area on the prime modulator 24. If the final image requires a bright pixel, a suitably sized block of pixels on the pre-modulator image 142 can be selected to support such brightness. The dilation filter 146 can be configured to set an output pixel to be the same intensity as the brightest pixel within a given radius. Scaling and warp 148 can be performed for the pre-modulator image 142 to compensate for misalignment between the pre-modulator 20 and the prime modulator 24 so as to associate pixels on the prime modulator 24 with pixels on the pre-modulator 20. Halftoning 150 can be performed on the scaled/warped and dilated image, so that the pre-modulator image 142 is a halftone image, as discussed elsewhere herein. Light field estimation 152 can be performed using the calibration data 98 discussed above. That is, the pixel shaping function is convolved with a halftone 150 of the source image 140 to determine how much light is arriving at a given pixel of the prime modulator 24. This light field can also be warped and scaled 156 to account for misalignments and distortions, and the warp function applied to the light field can be the inverse of the warp/scale function 148 used on the pre-modulator image 142. Then, the image 144 to display on the primary modulator 24 is determined by dividing 158 the pixels of the original image by the results of the light field estimation.

Figures 4A, 5A, 5B, 5C:
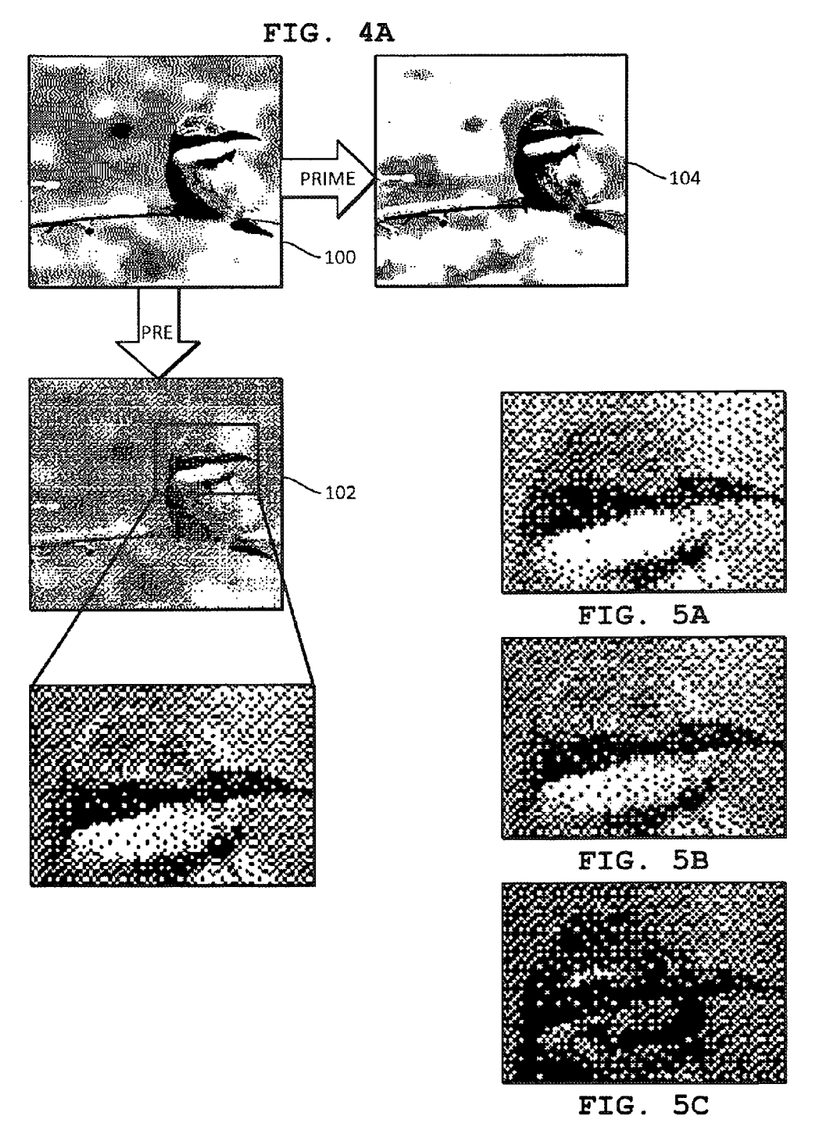
FIG. 4A is a diagram showing an examples of source, pre-modulator, and prime-modulator images.
FIG. 5A is a diagram showing a color component of a halftone image.
FIG. 5B is a diagram showing another color component of the halftone image.
FIG. 5C is a diagram showing yet another color component of the halftone image.
Figure 4B:
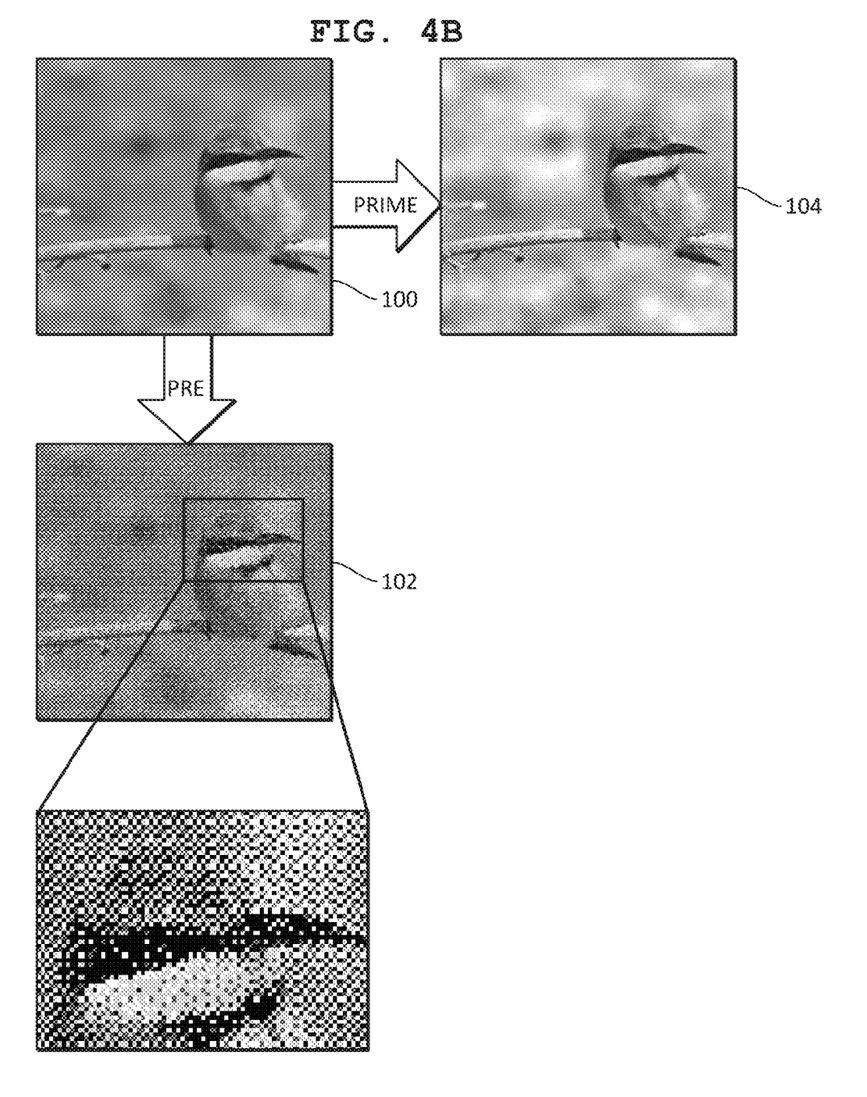
FIG. 4B is a color representation of FIG. 4A.

FIG. 4A shows an example of a source image 100 corresponding to example image data 92 (FIG. 3) and a transformation of the image 100. The source image 100 is what is to be reproduced as the output image 68 (FIG. 1). The pre-modulator 20 is provided with a modified image 102 that is based on the image 100. The modified image 102 can be generated by the program 94 (FIG. 3) with reference to the image data 92. FIG. 4A also shows an example prime-modulator image 104 that is generated from the image data 92 of the source image 100 and provided for display at the prime modulator 24. Although they are reproduced in black and white in FIG. 4A, the images 100, 102, 104 are full color images, and any apparent dithering or pixelization present are for illustrative purposes only (within the confines of black-and-white line drawings) and do not generally occur. FIG. 4B shows color representations of the images 100, 102, 104.

In this embodiment, the modified image 102 is a digital halftone image of the source image 100 (see close up region of FIGS. 4A-4B). Each color component is processed independently by its respective DMD 46, 48, 50, and the digital halftone image 102 may be color separated as shown in FIGS. 5A-C. As such, each pre-modulator DMD 46, 48, 50 receives a respective color component of the digital halftone image, such as a red component (FIG. 5A), a green component (FIG. 5B), and a blue component of the digital halftone image (FIG. 5C). In other embodiments, other kinds of spatial dithering can be used instead of halftoning.

Figure 6:
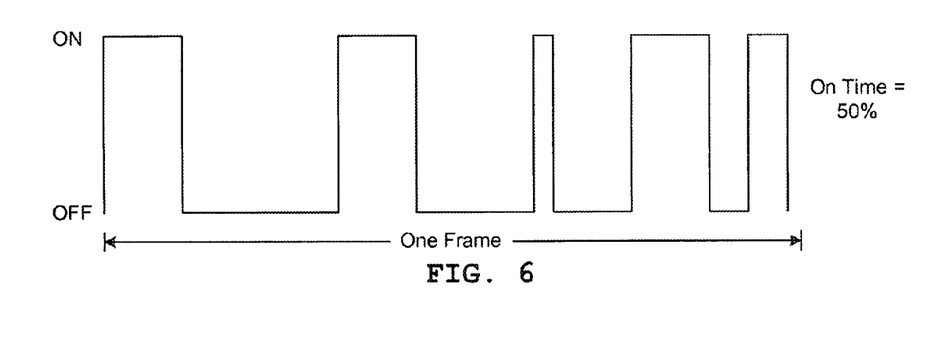
FIG. 6 is a diagram of pulse width modulation for an imager.
Figure 7:
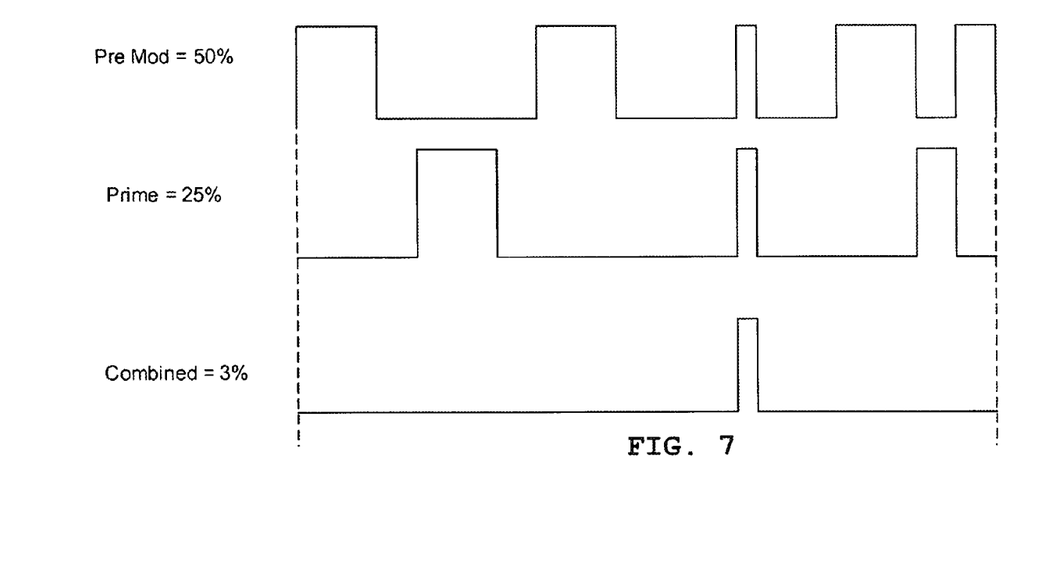
FIG. 7 is a diagram of pulse width modulation for two imagers in series.

Digital halftoning can help avoid bit sequence interference that can occur when pulse-width modulation (PWM) is used to generate pixel brightness levels. For a particular frame of video, a given mirror of a DMD may flip over 100 times, with the percentage of time on corresponding to pixel brightness level. A specific pattern of on and offs that combine to produce a given brightness level may be referred to as a bit sequence, as shown in FIG. 6. When using PWM at both modulators 20, 24, a given pixel is on when the corresponding mirrors of both the pre-modulator 20 and the prime modulator 24 are in their on states. As shown in FIG. 7, a 50%-on bit sequence at the pre-modulator and a 25%-on bit sequence at the prime modulator 20 would not usually result in a 12.5% brightness (i.e., 50%*25%) level for a given pixel. Rather, only contemporaneous on states contribute to the output brightness. In the example shown, about 3% of the light provided to the modulators 20, 24 would contribute to the pixel's brightness.

Providing the digital halftone image 102 to the pre-modulator allows each pixel of the pre-modulator DMDs 46, 48, 50 to remain either on or off for the entire duration of display of the image 100, such as the duration of display for one frame of video. Brightness at the pre-modulator 20 is thus controlled by spatial dithering for each color component, rather than PWM.

When selecting a kernel size for digital halftoning, it is contemplated that a larger kernel tends to give better performance in terms of dynamic range, but may lead to artifacts such as halos. A larger kernel size may also increase the amount of processing power required to generate an image. In some examples, a 5-by-5 kernel is used to generate the halftone image 102.

Figure 8:
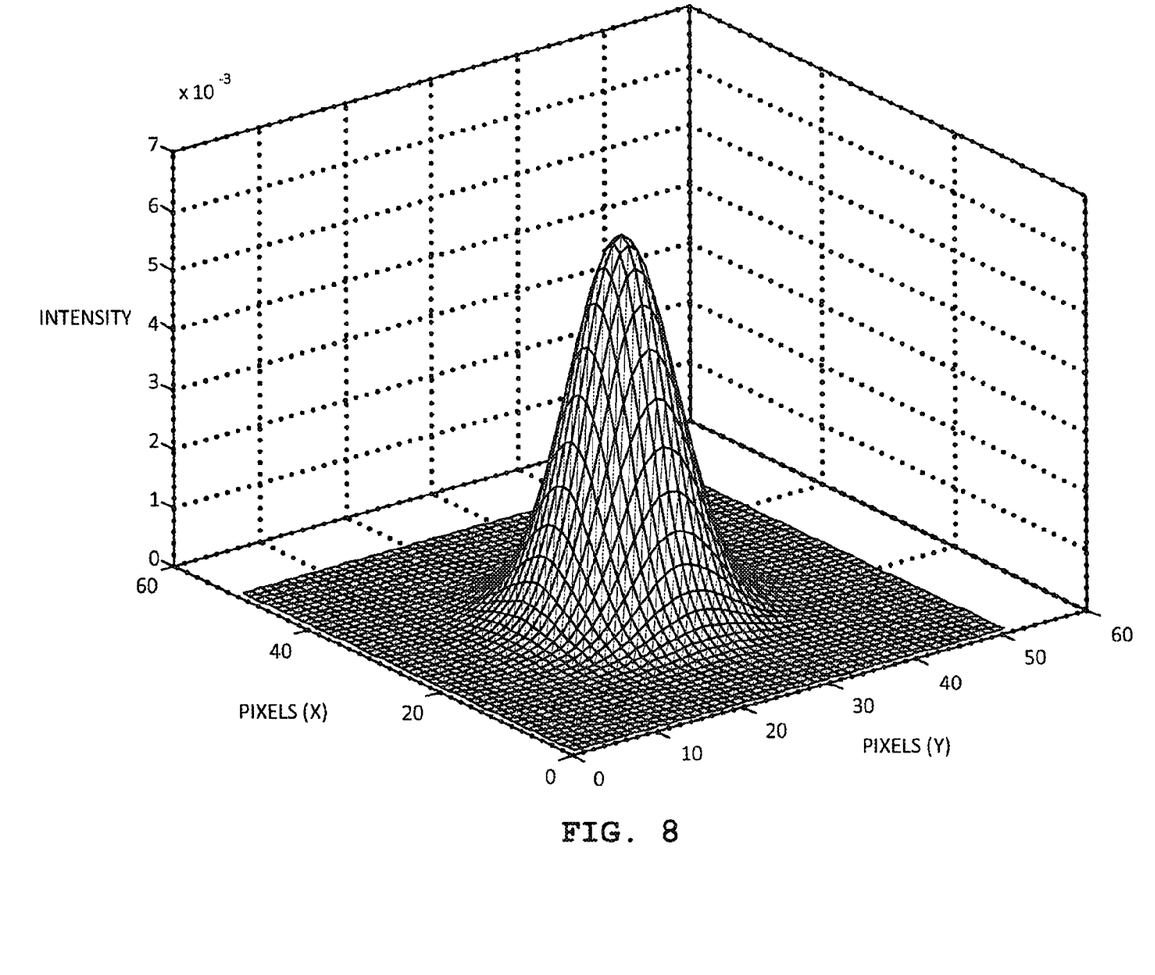
FIG. 8 is a graph showing a Gaussian shaped spot of a pixel of the pre-modulator as produced by a pixel shaping function of the relay optics.

As mentioned, the relay optics 22 are configured to provide controlled defocus. The relay optics 22 can be configured to perform a controlled defocus such that a single pixel on the pre-modulator 24 becomes a Gaussian or pseudo-Gaussian shaped spot of light on the prime modulator 20, as shown in FIG. 8. When the prime modulator DMDs 72, 74, 76 are selected to have a resolution of 4096×2160 pixels, then the relay optics 22 may be configured to provide such a Gaussian shaped spot of approximately 30×30 pixels in size. This is merely one example, and any spot size can be used, provided that any additional processing resources required for larger spots is available or any reduced improvement in dynamic range from smaller spots can be tolerated. Further, a Gaussian shaped spot contemplates other shapes that may not precisely conform to a Gaussian function.

Figure 9A:
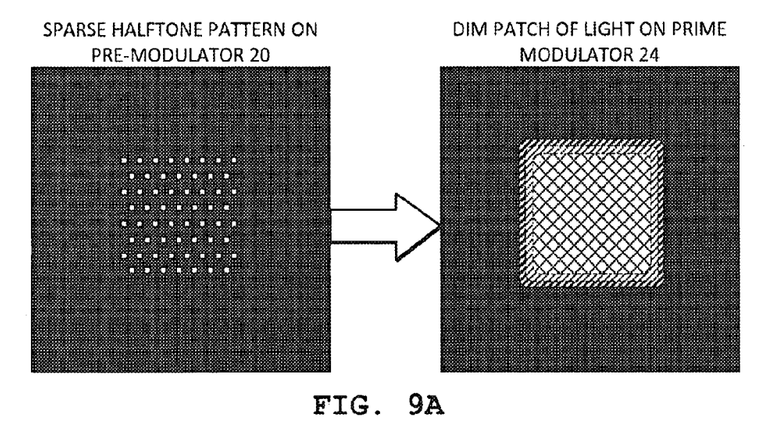
FIG. 9A is a diagram showing an example sparse halftone pattern from the pre-modulator being combined by the relay optics onto the prime modulator.
Figure 9B:
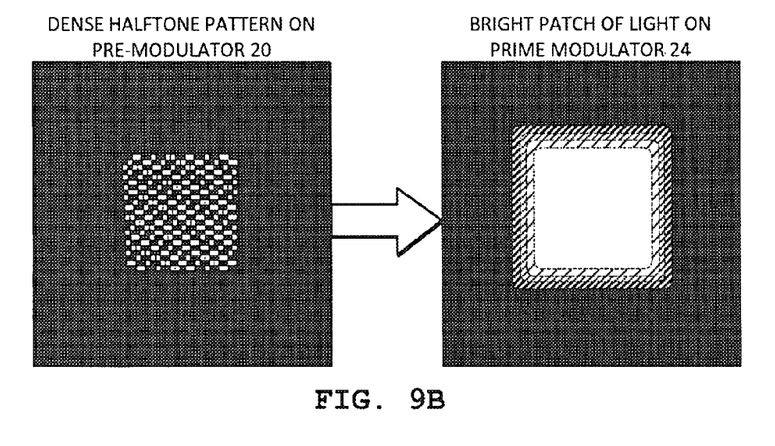
FIG. 9B is a diagram showing an example dense halftone pattern from the pre-modulator being combined by the relay optics onto the prime modulator.
Figure 9C:
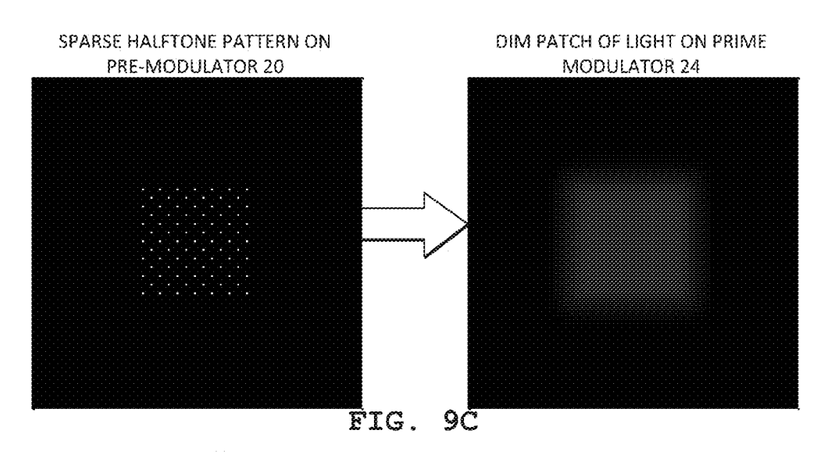
FIG. 9C is a grayscale representation of FIG. 9A.
Figure 9D:
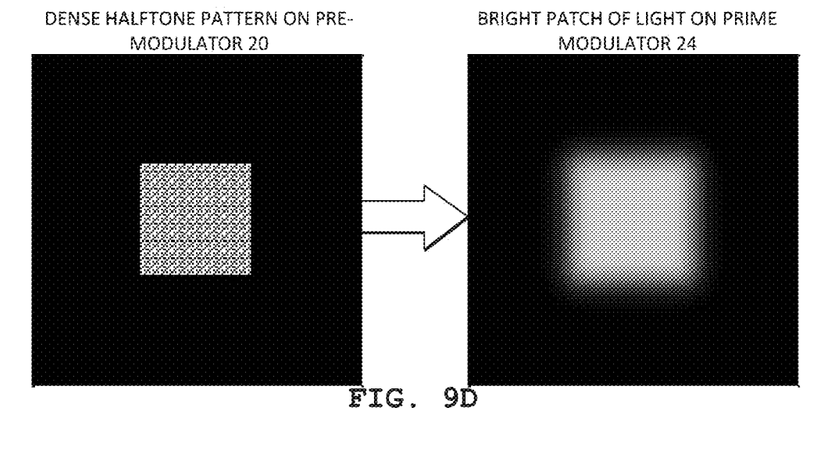
FIG. 9D is a grayscale representation of FIG. 9B.

After defocusing, individual pixels of the pre-modulator 20 become blurred into a continuous patch of light at the prime modulator 24. The densities of pixels turned on at the pre-modulator 20 control the brightness of the patch of light on the prime modulator 24, as neighboring Gaussian shaped spots from neighboring pre-modulator pixels superimpose upon each other at the prime modulator 24. As shown in FIGS. 9A and 9C, a sparse halftone pattern of fully-on (i.e., not pulse-width modulated) pixels in a region of the pre-modulated beam 42 results in a relatively dim patch of light. As shown in FIGS. 9B and 9D, a dense halftone pattern of fully-on pixels in a region of the pre-modulated beam 42 results in a bright patch of light. This occurs for each color component and for various patches of light. Note that the right-hand sides of FIGS. 9A and 9B show regions of different light intensity increasing in brightness towards the center, whereas FIGS. 9C and 9D illustrate the same concept in continuous grayscale. Any dithering or pixelization in FIGS. 9A and 9B are for illustrative purposes only (within the confines of black-and-white line drawings) and do not generally occur.

As mentioned above, the integrator 16 homogenizes the distribution of source light both spatially and angularly, which can lead to improved performance of the pixel shaping function realized by the relay optics 22, and thus less required complexity in the processor 84 and program 94 due to the pixel shaping function providing relatively uniform patches of light to the prime modulator 24. It is contemplated that in many implementations the source light will have a substantially or even a highly non-uniform angular distribution. Thus, the integrator 16 can be designed with consideration to the selected type of light source and the selected pixel shaping function, so as to simplify the processing required.

Figure 11:
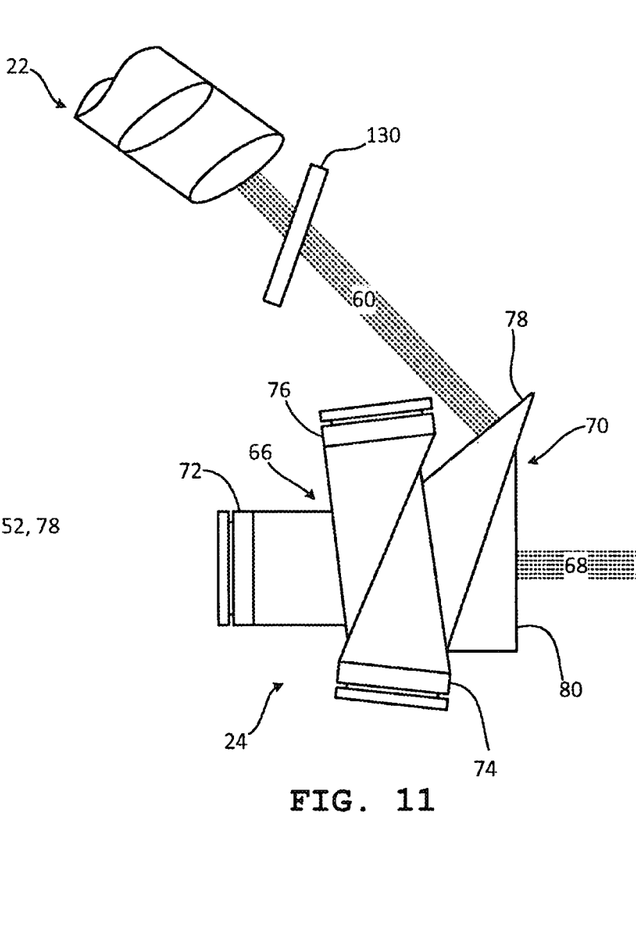
FIG. 11 is a block diagram of a portion of the imaging apparatus showing a compensator plate.

With reference to FIG. 11, because a small amount of magnification may be provided between the modulators 20, 24 and because DMDs of the modulators 20, 24 may be of different sizes, light paths between DMDs may benefit from a compensator plate 130 (e.g., a tilted sheet of glass) located in the path of defocused light 60 between the relay optics 22 and the prime modulator 24.

In this embodiment, the compensator plate 130 is a tilted parallel plate of glass that may help compensate for optical aberrations from the first total internal reflection prism system 44 and color-component splitters and combiners 122 of the pre-modulator 20. Such aberrations may include asymmetric astigmatism, coma, and image plane tilt (e.g., defocusing of the image due to optical misalignment). The thickness, tilt angle, tilt direction, or other parameters of the compensator plate 130 can be selected to reduce such aberrations.

The compensator plate 130 provides benefits with two modulators 20, 24 that would not be apparent in systems with one modulator. In systems with one modulator, the types of aberrations described above are usually of little concern because they occur in the illumination path of a light engine and some loss of efficiency is typically all that results. However, in the imaging apparatus 10, these aberrations may become a concern because both the pre-modulator 20 and the prime modulator 24 are in the same image path and may both behave like wedge prisms. Astigmatism may be of greater concern, followed by coma.

In another embodiment, the modulators 20, 24 each include one DMD for one component color and an independent imaging apparatus 10 is provided for each color component. The dichroic combiner 14 can be omitted and the light source 12 of each imaging apparatus 10 need only provide the respective color. Light of the different color components can be combined ahead of the projection optics 26. In a variation of this embodiment, the prime modulator 24 includes multiple DMDs, and the color components are combined ahead of the prime modulator 24.

In various embodiments, LCD and LCOS devices can be used in place of the DMDs, provided that any increase in processing complexity can be adequately handed and that lower levels of light can be tolerated.

While the foregoing provides certain non-limiting example embodiments, it should be understood that combinations, subsets, and variations of the foregoing are contemplated. The monopoly sought is defined by the claims.

What is claimed is:

1. An imaging apparatus comprising:
   a light source configured to emit source light;
   a pre-modulator positioned in a path of the source light, the pre-modulator including a pre-modulating imaging system configured to perform coarse modulation on the source light according to image data and to emit pre-modulated light at a pre-modulator output, the pre-modulator further including a first total internal reflection prism system oriented to refract the source light into the pre-modulating imaging system and to reflect the pre-modulated light received from the pre-modulated imaging system to the pre-modulator output;
   relay optics positioned in a path of the pre-modulated light and configured to defocus the pre-modulated light to output defocused light;
   a prime modulator positioned in a path of the defocused light, the prime modulator including a prime modulating imaging system configured to generate an image using the defocused light according to the image data, the prime modulator further including a second total internal reflection prism system oriented to reflect the defocused light to the prime modulating imaging system and to refract the image received from the prime imaging system to a prime modulator output; and
   an integrator positioned between the light source and the pre-modulator, the integrator including at least two integrating rods and at least one diffuser disposed between the at least two integrating rods.

2. The apparatus of claim 1, wherein the relay optics are configured to transform a pixel of the pre-modulated light into a substantially Gaussian shaped spot at the prime modulator.

3. The apparatus of claim 1, further comprising a processor coupled to the pre-modulator and the prime modulator, the processor configured to control the pre-modulator and the prime modulator according to the image data.

4. The apparatus of claim 3, wherein the processor performs halftoning on the image data and provides a halftone image to the pre-modulator.

5. The apparatus of claim 1, wherein the light source comprises laser light sources of multiple color components, and the apparatus further comprises projection optics positioned to receive light from the prime modulator output.

6. The apparatus of claim 1, wherein the integrator is configured to spatially and angularly homogenize the source light.

7. The apparatus of claim 1, wherein the integrator is configured to output integrated source light with an aspect ratio that matches an aspect ratio of an imaging device of the pre-modulator.

8. An imaging apparatus comprising:
   a light source configured to emit source light;
   two light modulators, each light modulator including a multi-chip imaging system coupled to a total internal reflection prism system, the total internal reflection prism system having a light input face and an on-state face;
   relay optics positioned between a pre-modulator of the two light modulators and a prime modulator of the two light modulators, the relay optics configured to defocus light received from the pre-modulator and to provide defocused light to the prime modulator; and
   an integrator positioned between the light source and the pre-modulator, the integrator including at least two integrating rods and at least one diffuser disposed between the at least two integrating rods;
   the prime modulator oriented to receive defocused light from the relay optics at the light input face of the total internal reflection prism system;
   the pre-modulator oriented to receive source light at the on-state face of the total internal reflection prism system and to output pre-modulated light to the relay optics via the light input face of the total internal reflection prism system.

9. The apparatus of claim 8, wherein the relay optics are configured to transform a pixel of the pre-modulated light into a substantially Gaussian shaped spot at the prime modulator.

10. The apparatus of claim 8, further comprising a processor coupled to the pre-modulator and the prime modulator, the processor configured to control the pre-modulator and the prime modulator according to image data.

11. The apparatus of claim 10, wherein the processor performs halftoning on the image data and provides a halftone image to the pre-modulator.

12. The apparatus of claim 8, wherein the light source comprises laser light sources of multiple color components, and the apparatus further comprises projection optics positioned to receive light from the prime modulator.

13. The apparatus of claim 8, wherein the integrator is configured to spatially and angularly homogenize the source light.

14. The apparatus of claim 8, wherein the integrator is configured to output integrated source light with an aspect ratio that matches an aspect ratio of an imaging device of the pre-modulator.

15. An imaging apparatus comprising:
a light source configured to emit source light;
a pre-modulator positioned in a path of the source light, the pre-modulator including a pre-modulating imaging system configured to perform coarse modulation on the source light according to image data and to emit pre-modulated light at a pre-modulator output, the pre-modulator further including a first total internal reflection prism system oriented to refract the source light into the pre-modulating imaging system and to reflect the pre-modulated light received from the pre-modulated imaging system to the pre-modulator output;
relay optics positioned in a path of the pre-modulated light and configured to defocus the pre-modulated light to output defocused light;
a prime modulator positioned in a path of the defocused light, the prime modulator including a prime modulating imaging system configured to generate an image using the defocused light according to the image data, the prime modulator further including a second total internal reflection prism system oriented to reflect the defocused light to the prime modulating imaging system and to refract the image received from the prime imaging system to a prime modulator output; and
overfill optics positioned between the light source and the pre-modulator, the overfill optics configured to overfill the pre-modulator with source light, wherein the overfill optics are configured with one or both of adjustable zoom and adjustable alignment to allow precise definition of one or both of shape and amount of the overfill.

16. The apparatus of claim 15, wherein the relay optics are configured to transform a pixel of the pre-modulated light into a substantially Gaussian shaped spot at the prime modulator.

17. The apparatus of claim 15, further comprising a processor coupled to the pre-modulator and the prime modulator, the processor configured to control the pre-modulator and the prime modulator according to the image data.

18. The apparatus of claim 17, wherein the processor performs halftoning on the image data and provides a halftone image to the pre-modulator.

19. The apparatus of claim 15, wherein the light source comprises laser light sources of multiple color components, and the apparatus further comprises projection optics positioned to receive light from the prime modulator output.

20. An imaging apparatus comprising:
a light source configured to emit source light;
two light modulators, each light modulator including a multi-chip imaging system coupled to a total internal reflection prism system, the total internal reflection prism system having a light input face and an on-state face;
relay optics positioned between a pre-modulator of the two light modulators and a prime modulator of the two light modulators, the relay optics configured to defocus light received from the pre-modulator and to provide defocused light to the prime modulator; and
overfill optics positioned between the light source and the pre-modulator, the overfill optics configured to overfill the pre-modulator with source light, wherein the overfill optics are configured with one or both of adjustable zoom and adjustable alignment to allow precise definition of one or both of shape and amount of the overfill;
the prime modulator oriented to receive defocused light from the relay optics at the light input face of the total internal reflection prism system;
the pre-modulator oriented to receive source light at the on-state face of the total internal reflection prism system and to output pre-modulated light to the relay optics via the light input face of the total internal reflection prism system.

21. The apparatus of claim 20, wherein the relay optics are configured to transform a pixel of the pre-modulated light into a substantially Gaussian shaped spot at the prime modulator.

22. The apparatus of claim 20, further comprising a processor coupled to the pre-modulator and the prime modulator, the processor configured to control the pre-modulator and the prime modulator according to image data.

23. The apparatus of claim 22, wherein the processor performs halftoning on the image data and provides a halftone image to the pre-modulator.

24. The apparatus of claim 20, wherein the light source comprises laser light sources of multiple color components, and the apparatus further comprises projection optics positioned to receive light from the prime modulator.

* * * * *